US011536958B2

United States Patent
Chung et al.

(10) Patent No.: US 11,536,958 B2
(45) Date of Patent: Dec. 27, 2022

(54) FERROFLUID SEALED DEFORMABLE MIRROR

(71) Applicant: Raytheon Company, Waltham, MA (US)

(72) Inventors: Peter Chung, Greenville, TX (US); Brett A. Miller, McKinney, TX (US); Stephen T. Fasolino, McKinney, TX (US)

(73) Assignee: Raytheon Company, Waltham, MA (US)

( * ) Notice: Subject to any disclaimer, the term of this patent is extended or adjusted under 35 U.S.C. 154(b) by 187 days.

(21) Appl. No.: 16/863,988

(22) Filed: Apr. 30, 2020

(65) Prior Publication Data

US 2021/0341734 A1    Nov. 4, 2021

(51) Int. Cl.
  *G02B 26/08*  (2006.01)
  *G02B 27/00*  (2006.01)

(52) U.S. Cl.
  CPC ..... *G02B 27/0068* (2013.01); *G02B 26/0825* (2013.01)

(58) Field of Classification Search
  USPC .......................................... 359/846–849, 878
  See application file for complete search history.

(56) References Cited

U.S. PATENT DOCUMENTS

| 4,046,462 A | 9/1977 | Fletcher et al. |
| 6,293,680 B1 | 9/2001 | Bruns |
| 7,708,415 B2 * | 5/2010 | Griffith .............. G02B 26/0825 359/846 |

(Continued)

FOREIGN PATENT DOCUMENTS

| CN | 105842844 A | 8/2016 |
| DE | 19615809 A1 | 10/1997 |

(Continued)

OTHER PUBLICATIONS

Lemmer et al, Mathematical and computational modeling of a ferrofluid deformable mirror for high-contrast imagng, Advances in Optical and Mechanical Technologies for Telescopes and Instrumentation II, Jul. 22, 2016, 15 pages, SPIE, Bellingham, WA.

(Continued)

*Primary Examiner* — Jennifer D. Carruth

(57) ABSTRACT

A deformable mirror can include a reservoir containing a ferrofluid. The deformable mirror can also include a reflective face sheet covering a front side of the reservoir such that a back side of the reflective face sheet is exposed to the ferrofluid. The reflective face sheet can have a reflective surface on a front side of the reflective face sheet opposite the back side. The reflective face sheet can have a non-uniform thickness between the front and back sides of the reflective face sheet to provide stiffness for the reflective face sheet. In addition, the deformable mirror can include one or more electromagnets operable to generate a magnetic field that acts on the ferrofluid to deform the reflective face sheet. A deformable mirror system can further include a control system operably coupled to the one or more electromagnets to control the magnetic field and thereby a deformation of the reflective face sheet.

28 Claims, 9 Drawing Sheets

(56) References Cited

U.S. PATENT DOCUMENTS

| | | | |
|---|---|---|---|
| 7,780,300 B2* | 8/2010 | Falk | G02B 26/0833 |
| | | | 359/849 |
| 8,079,721 B2 | 12/2011 | Hammann | |
| 8,444,280 B2 | 5/2013 | Borra et al. | |
| 9,709,713 B1 | 7/2017 | Chen | |
| 2009/0067027 A1 | 3/2009 | Hennigan | |
| 2010/0027143 A1 | 2/2010 | Angel | |
| 2014/0346156 A1* | 11/2014 | Bischof | B23K 26/0643 |
| | | | 219/121.81 |
| 2015/0168673 A1* | 6/2015 | Devilliers | G02B 7/183 |
| | | | 428/116 |
| 2016/0225505 A1* | 8/2016 | Pascall | H01F 7/081 |
| 2019/0049717 A1 | 2/2019 | Man | |

FOREIGN PATENT DOCUMENTS

| | | | |
|---|---|---|---|
| EP | 0025834 A2 | 4/1981 | |
| EP | 0769712 A1 | 4/1997 | |
| EP | 2538152 A1 | 12/2012 | |

OTHER PUBLICATIONS

Invitation to Pay Additional Fees for International Application No. PCT/US2021/020100 dated Jun. 25, 2021, 12 pages.
International Search Report for International Application No. PCT/US2022/029021 dated Aug. 2, 2022, 16 pages.

* cited by examiner

FERROFLUID SEALED DEFORMABLE MIRROR

BACKGROUND

Adaptive optics technology is used to improve the performance of optical systems, typically by reducing the effect of incoming wavefront distortions by deforming a mirror in order to compensate for the distortion. Adaptive optics are often used to remove the effects of atmospheric distortion, reduce optical aberrations, and correct alignment in optical systems, and therefore finds broad application, such as in airborne systems (e.g., missiles), astronomical telescopes, laser communication systems, microscopy, optical fabrication, retinal imaging systems, etc. Adaptive optics measures the distortions in a wavefront and compensates for the distortions with a device (e.g., a deformable mirror) that corrects those errors. Many types of deformable mirrors currently exist, including segmented mirrors, continuous faceplate mirrors (e.g., with discrete actuators or magnetic actuators), and ferrofluid liquid mirrors.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
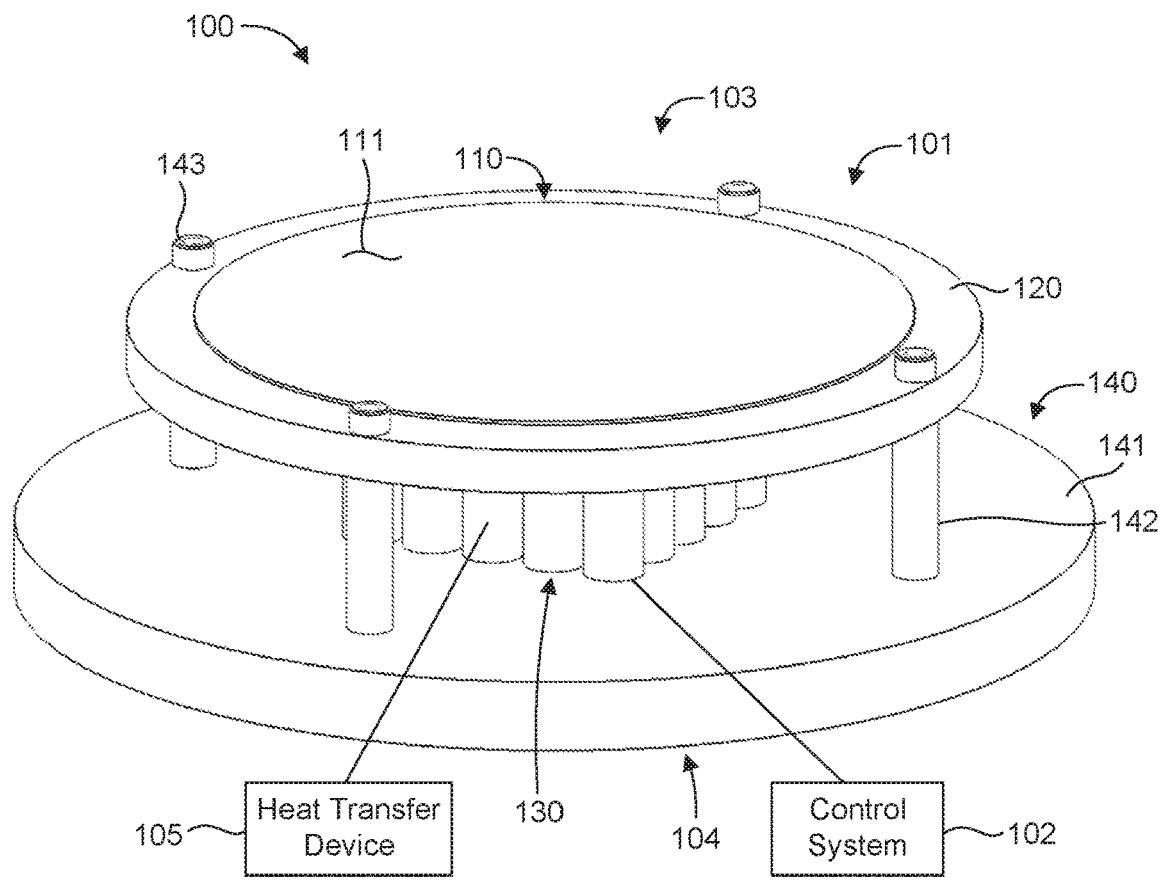
FIG. 1 is a top perspective view of a deformable mirror and system in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

Although deformable mirrors are generally effective in adaptive optics systems, existing deformable mirrors have attributes that limit performance. For example, segmented mirrors and continuous faceplate mirrors (e.g., with discrete actuators or magnetic actuators) have rigid actuator to mirror coupling that results in coefficient of thermal expansion (CTE) mismatch issues and a "quilting" effect distortion of the final image. Typical ferrofluid liquid mirrors, which utilize electromagnets to control magnetic fields acting on a ferrofluid, lack a reflective face sheet over the ferrofluid and therefore are not suitable for use on dynamic platforms. Even in ferrofluid liquid mirrors that do have reflective face sheets over the ferrofluid, the face sheets lack the structural characteristics to enable use on dynamic platforms and provide adequate mirror performance.

Accordingly, a ferrofluid deformable mirror is disclosed that avoids the quilting effect distortion of discrete actuator mirrors and provides suitable mirror performance on dynamic platforms. The deformable mirror can include a reservoir containing a ferrofluid. The deformable mirror can also include a reflective face sheet covering a front side of the reservoir such that a back side of the reflective face sheet is exposed to the ferrofluid. The reflective face sheet can have a reflective surface on a front side of the reflective face sheet opposite the back side. The reflective face sheet can have a non-uniform thickness between the front and back sides of the reflective face sheet to provide stiffness for the reflective face sheet. In addition, the deformable mirror can include one or more electromagnets operable to generate a magnetic field that acts on the ferrofluid to deform the reflective face sheet.

In one aspect, a deformable mirror system can comprise a deformable mirror. The deformable mirror can include a reservoir containing a ferrofluid. The deformable mirror can also include a reflective face sheet covering a front side of the reservoir such that a back side of the reflective face sheet is exposed to the ferrofluid. The reflective face sheet can have a reflective surface on a front side of the reflective face sheet opposite the back side. The reflective face sheet can have a non-uniform thickness between the front and back sides of the reflective face sheet to provide stiffness for the reflective face sheet. In addition, the deformable mirror can include one or more electromagnets operable to generate a magnetic field that acts on the ferrofluid to deform the reflective face sheet. The deformable mirror system can also comprise a control system operably coupled to the one or more electromagnets to control the magnetic field and thereby a deformation of the reflective face sheet.

Figure 2:
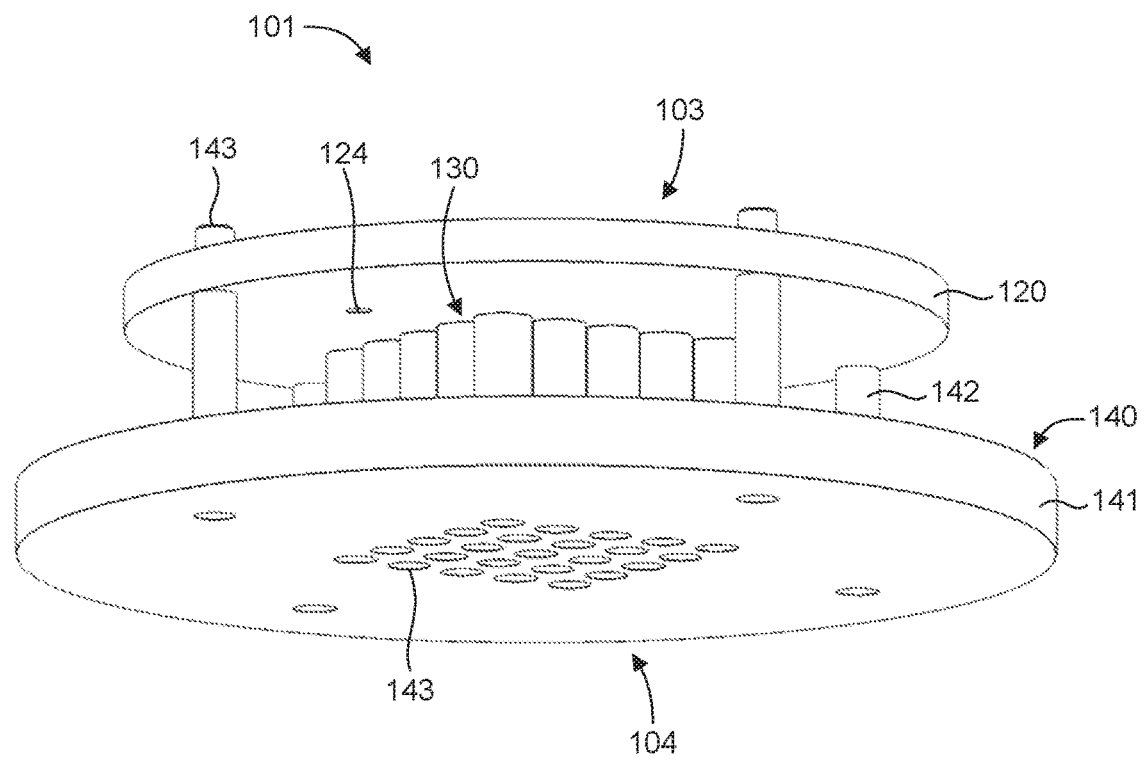
FIG. 2 is a bottom perspective view of the deformable mirror of FIG. 1, in accordance with an example of the present disclosure.
Figure 3:
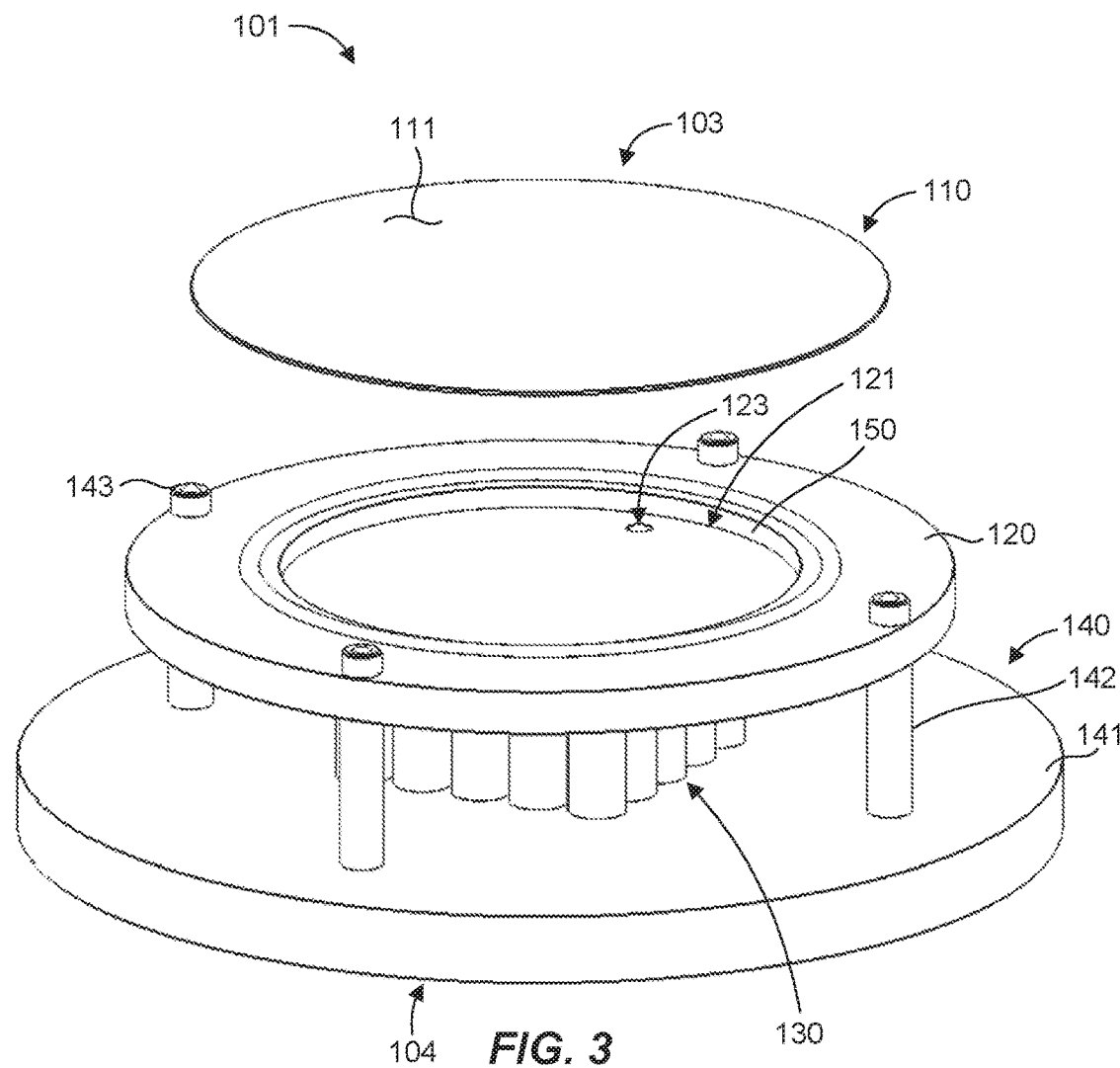
FIG. 3 is a partially exploded view of the deformable mirror of FIG. 1, in accordance with an example of the present disclosure.
Figure 5:
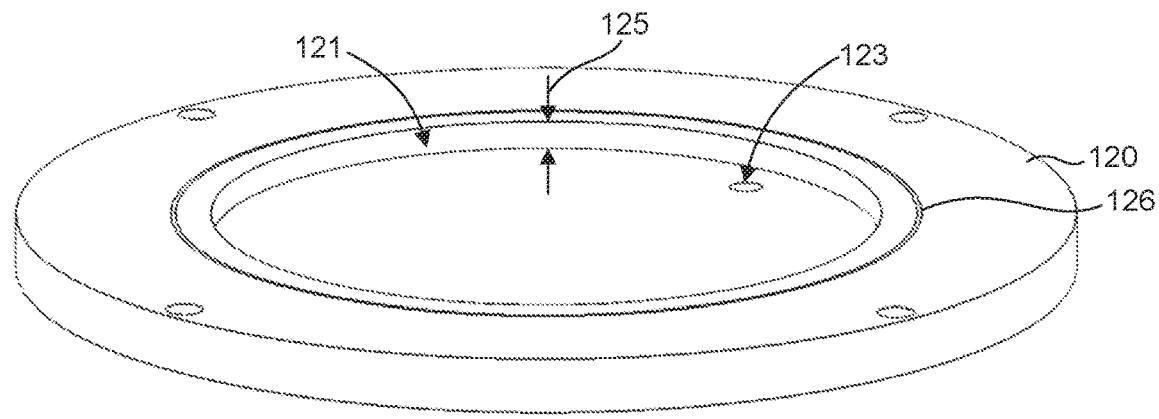
FIG. 5 is a top perspective view of a reservoir body of the deformable mirror of FIG. 1, in accordance with an example of the present disclosure.
Figure 6:
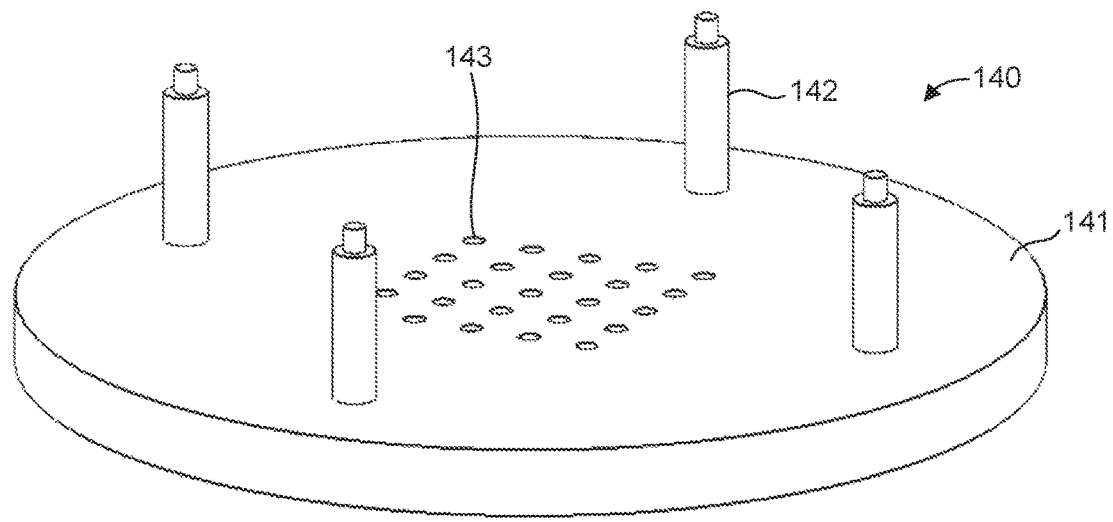
FIG. 6 is a top perspective view of a support structure of the deformable mirror of FIG. 1, in accordance with an example of the present disclosure.

To further describe the present technology, examples are now provided with reference to the figures. With reference to FIG. 1, one embodiment of a deformable mirror system 100 is illustrated. The system 100 can comprise a deformable mirror 101 and a control system 102 operable to control the deformable mirror 101. The deformable mirror 101 can comprise a reflective face sheet 110, a reservoir body 120, one or more electromagnets 130, and a support structure 140. The deformable mirror 101 is shown in a top perspective view in FIG. 1, a bottom perspective view in FIG. 2, a partially exploded view in FIG. 3, and a side view with a cross-section detail in FIG. 4. The reservoir body 120 is shown isolated in FIG. 5. The support structure 140 is shown isolated in FIG. 6. A front side 103 and a back side 104 of the deformable mirror 101 and its components are indicated generally in FIGS. 1-4.

Figure 4:
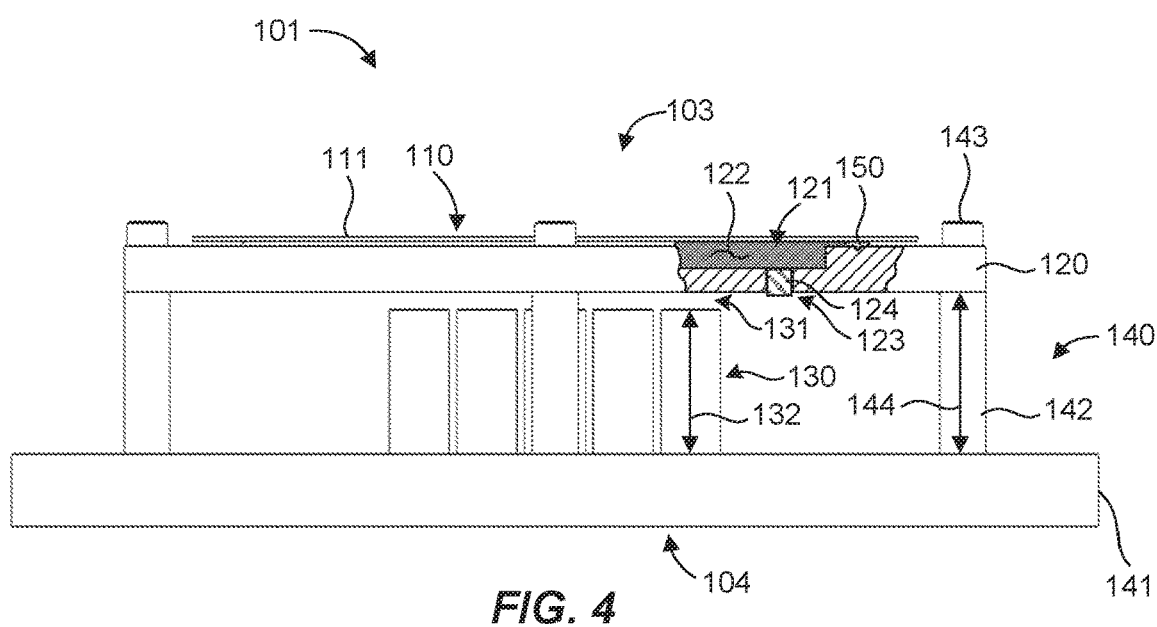
FIG. 4 is a side view with a cross-section detail of the deformable mirror of FIG. 1, in accordance with an example of the present disclosure.

The reservoir body 120 can define a reservoir 121 (FIGS. 3-5) containing a ferrofluid 122 (FIG. 4). The reflective face sheet 110 can cover a front side of the reservoir 121 such that a back side of the reflective face sheet 110 is exposed to the ferrofluid 122. The reflective face sheet 110 can have a reflective surface 111 on a front side of the reflective face sheet 110 opposite the back side. The reflective face sheet 110 can be constructed of any suitable material, such as silicon, glass, aluminum or beryllium. The ferrofluid 122 behind the reflective face sheet 110 can create a hydrostatic force on the reflective face sheet 110. The electromagnets 130 can be positioned relative to a back side of the reservoir 121 (e.g., behind the reservoir body 120). Any suitable number of electromagnets can be utilized, such as only a single electromagnet or multiple electromagnets. Additionally, the electromagnets 130 can be the same size or different sizes (e.g., diameter, height, etc.). The control system 102 can be operably coupled to electromagnets 130 to control a magnetic field generated by the electromagnets 130. The various structural components of the deformable mirror 101 (e.g., the reservoir body 120 and the support structure 140) can be made of non-ferromagnetic materials, such as aluminum, to avoid undesirable magnetic field effects during operation of the electromagnets 130.

Ferrofluids are a colloidal liquid comprising ferromagnetic nanoparticles, a carrier fluid (typically water or oil base), and a surfactant. When a ferrofluid is in the presence of a magnetic field of sufficient strength, the magnetic forces acting on the ferrofluid overcome the surface tension of the liquid, resulting in spike-shaped magnetic field formations in the ferrofluid known as the Rosensweig effect. The present technology utilizes these principles in the deformable mirror 101.

For example, the electromagnets 130 can be operable to generate a magnetic field that acts on the ferrofluid 122 to cause a deformation of the reflective face sheet 120. In particular, as current flows through the electromagnets 130, a localized magnetic field is created. The magnetic field generated by the electromagnets 130 can act on the ferrofluid 122 and a localized pressure gradient can be created in the ferrofluid 122, which can induce a localized stress on the reflective face sheet 110 to locally deform the reflective face sheet 110 under the pressure gradient. The electromagnets 130 may be referred to as actuators, pushing the ferrofluid 122 on the reflective face sheet 110 to deform the reflective face sheet 110. Actuator stroke is the deflection of the reflective surface 111 by a single electromagnet 130 or actuator, referred to as a "poke." Due to the presence and stiffness of the reflective face sheet 110, the ferrofluid 122 can influence the shape of the reflective surface 111 but the reflective surface 111 does not completely mimic the ferrofluid (e.g., in taking on spike formations).

One benefit of the present technology is that fluid forces behind the reflective face sheet 110 do not produce "quilting" effects often associated with discrete actuators (e.g., mechanical or electromechanical actuators) in other types of deformable mirrors.

In one aspect, the control system 102 can be operable to independently control (e.g., independently power) each of the electromagnets 130 for optimum shape control of the reflective face sheet 110. For example, pokes of each electromagnet 130 can be measured by an interferometer. A linear combination of these pokes can create many different mirror shapes. In a particular aspect, the control system 102 can be operable to reverse polarity of the electromagnets 130 (e.g., reverse current polarity of the individual electromagnets 130, such as reversed polarity in adjacent electromagnets) to provide further control over the shape of the reflective face sheet 110. Thus, the electromagnets 130 can be energized in a coordinated manner by the control system 102 to generate a magnetic field operable to achieve a desired shape or response of the reflective face sheet 110. For example, a boundary condition shape on the reflective face sheet 110 can be controlled to achieve optical power correction for various mirror angles of incidence, to control or correct wavefront error, etc.

In one aspect, the deformable mirror 101 can include a heat transfer device 105 thermally coupled to the electromagnets 130 to facilitate cooling the electromagnets 130, which can allow for more current thereby increasing actuator stroke. The heat transfer device 105 can be of any suitable type or configuration known in the art, such as any suitable passive or active heat transfer device. For example, the heat transfer device 105 can include a liquid coolant contained in cooling jackets about the electromagnets 130. The liquid can be heated by the electromagnets 130 (e.g., by wire coils or windings of the electromagnets) and can flow away from the electromagnets 130 where the liquid can be cooled, e.g., by a heat exchanger, fins, etc. Liquid flow can be forced to actively cool the electromagnets 130 or driven by natural convection to passively cool the electromagnets 130. Any suitable liquid coolant can be utilized, such as a ferrofluid (e.g., locate the electromagnets 130 in the reservoir 121 such that the electromagnets 130 are immersed in the ferrofluid 122), ethylene glycol mixed with water (EGW), or polyalphaolefin (PAO).

In one aspect, the support structure 140 can include a base 141 in support of the reservoir 121 (e.g., the reservoir body 120) and the electromagnets 130. The support structure 140 can also include one or more stand-off supports 142 coupling the reservoir 121 (e.g., the reservoir body 120) to the base 141. The reservoir body 120 can be secured to the stand-off supports 142 in any suitable manner, such as by one or more fasteners 143. In one aspect, the reservoir body 120 and the electromagnets 130 can be physically separate from one another (e.g., not affixed or directly joined to one another). In other words, the reservoir body 120 and the electromagnets 130 can be in direct physical contact, but not attached or joined at such an interface. Thus, the electromagnets 130 are not directly physically coupled to the ferrofluid 122 (e.g., the reservoir body 120) or the reflective face sheet 110.

Physically separate components can enable a modular design where the electromagnets 130, the reservoir body 120, and/or the reflective face sheet 110 can be easily reconfigured or replaced for a given application or repair.

For example, a depth 125 (FIG. 5) of the reservoir 121 can influence actuator stroke. Therefore, the reservoir 121 may be changed with a reservoir having a different depth to achieve a desired response. In addition, the reflective face sheet 110 can have any suitable size or shape, such as circular, elliptical, polygonal (e.g., triangle, rectangle, pentagon, hexagon, octagon, etc.), freeform, etc. Different face sheet configurations (e.g., size, shape, and non-uniform thickness characteristics described below) can provide different performance attributes. Thus, the reflective face sheet 110 and/or the reservoir body 120 can be selected or changed to achieve a desired mirror response.

In one example, the reservoir body 120 and the electromagnets 130 can be physically separated from one another by a gap 131, as shown in FIG. 4. Such a gap 131 can be provided by appropriately sizing a length 144 of the stand-off supports 142 locating the reservoir body 120 from the base 141 to exceed the height 132 of the electromagnets 130 from the base 141. The gap 131 can be of any suitable size to enable ease of assembly/disassembly for reconfiguring or replacing components, although the gap 131 may be minimized for improved influence of the electromagnets 130 on the ferrofluid 122.

The base 141 can include mounting features 143 (FIG. 6) for mounting the electromagnets 130 to the base 141. The mounting features 143 can be of any suitable type or configuration, such as a mounting hole, socket, pin, tab, bracket, or any other suitable structure for mounting an electromagnet 130 to the base 141. In some examples, a number of the mounting features 143 can exceed a number of the electromagnets 130 to provide alternate mounting arrangements for the electromagnets 130 on the base 141. Thus, an electromagnet 130 array pattern, pitch, spacing, quantity, size, shape, etc. can be adjusted by appropriately configuring the number and location of the mounting features 143 on the base 141.

In one aspect, the reflective face sheet 110 can be bonded to the reservoir body 120 to seal the ferrofluid 122 in the reservoir 121. The reflective face sheet 110 can be bonded to the reservoir body 120 with any suitable adhesive or sealant 150 (FIGS. 3 and 4) that can maintain a sufficient seal for the ferrofluid 122 under operating conditions, such as Versachem gasket sealant, Solar Seal or other hydrocarbon resistant sealants, auto engine sealant, and others. The reservoir body 120 can include a groove 126 for locating and at least partially containing the adhesive or sealant 150. In one example, the reflective face sheet 110 can be bonded to the reservoir body 120 at a back surface on the back side of the reflective face sheet 110. This configuration with adhesive/sealant only on the back side of the reflective face sheet 110 can enable the top surface of the reflective face sheet 110 to be free from any contact that may cause undesirable distortion of the reflective face sheet 110.

Figure 7:
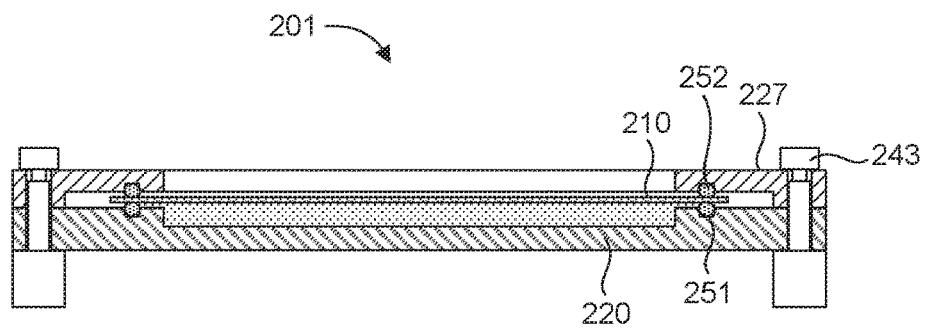
FIG. 7 side cross-section detail view of a deformable mirror in accordance with another example of the present disclosure.

As an alternative to this one-sided face sheet attachment approach, a two-sided face sheet attachment approach may be utilized, as shown in another example of a deformable mirror 201, an upper portion of which is shown in FIG. 7. In this case, the deformable mirror 201 includes an outer clamp 227. A reservoir body 220 of the deformable mirror 201 can be configured to support a seal 251, such as an O-ring. Likewise, the outer clamp 227 can be configured to support a seal 252, such as an O-ring. The seals 251, 252 can be configured to engage back and front sides, respectively, of a reflective face sheet 210. The outer clamp 227 can be secured to the reservoir body 220 in any suitable manner, such as by one or more fasteners 243, to clamp the reflective face sheet 210 between the seals 251, 252.

In one aspect, the reservoir body 120 can include a reservoir fill hole 123 (FIGS. 3-5) to facilitate filling the reservoir 121 with the ferrofluid 122. The reservoir fill hole 123 can be plugged by a plug 124 (FIGS. 2 and 4) to prevent the ferrofluid 122 from escaping via the reservoir fill hole 123.

In general, the reflective face sheet 110 can have any suitable configuration (e.g., size, shape, thickness, etc.) for a given application. For example, in some applications (e.g., when the deformable mirror 101 is mounted on a static or slow-moving platform) a uniform thickness may be suitable for the reflective face sheet 110. In other applications (e.g., when the deformable mirror 101 is mounted on a dynamic or fast-moving platform), a uniform thickness may not provide the performance required of the reflective face sheet 110. In a particular example, in order to operate in a tactical, airborne environment, a uniform thickness reflective face sheet may not allow for an adequate actuator stroke, since the face sheet must be thick enough to minimize wavefront error due to gravity sag (e.g., mirror deflection due to gravity) as well as increasing the natural frequency of the mirror surface (e.g., maximize structural modes so that vibration does not impact performance). Thus, the thickness required to provide adequate stiffness for gravity sag and structural mode considerations can greatly limit the magnitude of wavefront error that can be corrected by a uniform thickness face sheet.

Therefore, in one aspect, the reflective face sheet 110 can have a non-uniform thickness between the front and back sides of the reflective face sheet 110 to provide adequate stiffness for the reflective face sheet 110 in meeting gravity sag and structural mode design objectives while also providing for sufficient actuator stroke to correct a large magnitude of wavefront error. In other words, a non-uniform thickness of the reflective face sheet 110 can improve actuator stroke (e.g., increase influence of actuators on the face sheet), while simultaneously improving gravity sag and stiffness over a uniform thickness face sheet. Thus, a non-uniform thickness reflective face sheet 110 can be designed to optimize (e.g., maximize) actuator stroke and minimize gravity sag, which can facilitate tuning a mirror for different platforms. These principles are discussed in more detail below with reference to FIGS. 8A-10D.

FIGS. 8A-10D illustrate non-uniform thickness reflective face sheets 310, 410, 510 in accordance with several examples of the present disclosure. It should be noted that the topology due to non-uniform thickness of the reflective face sheet 310, 410, 510 is evident on a back side 304, 404, 504 of the reflective face sheet 310, 410, 510, as the reflective front side 303, 403, 503 is maintained flat or featureless to provide a suitable reflective surface 311, 411, 511.

The non-uniform thickness of the reflective face sheet 310, 410, 510 can be configured in any suitable manner to provide a desired stiffness and/or actuator responsiveness. In one aspect, the non-uniform thickness can be defined by a pattern formed on the back side 304, 404, 504 of the reflective face sheet 310, 410, 510. Any suitable uniform or non-uniform pattern can be implemented, and can include any shape or combination of shapes, lines, curves, etc. of any suitable size or configuration. In the illustrated example, the pattern comprises a polygon (e.g., hexagon) shape in a "honeycomb" pattern. In another aspect, the non-uniform thickness can be defined on the back side 304, 404, 504 by various or random shapes, lines, curves, etc. of various sizes. In one aspect, the non-uniform thickness can be defined on the back side 304, 404, 504 in a symmetrical relationship with the outer or perimeter shape of the reflective face sheet 310, 410, 510, which can provide a symmetric or uniform distribution of features defining the non-uniform thickness about the reflective face sheet 310, 410, 510. This can locate stiffness enhancing features (e.g., thicker portions) symmetrically or uniformly about the reflective face sheet 310, 410, 510. On the other hand, the non-uniform thickness can be defined on the back side 304, 404, 504 in an asymmetrical relationship with the outer or perimeter shape of the reflective face sheet 310, 410, 510, which can provide an asymmetric or non-uniform distribution of features defining the non-uniform thickness about the reflective face sheet 310, 410, 510. This can locate stiffness enhancing features (e.g., thicker portions) asymmetrically or non-uniformly about the reflective face sheet 310, 410, 510. For example, a uniform or symmetric distribution of features may be utilized when the reflective face sheet 310, 410, 510 will be primarily oriented facing in a vertical direction (e.g., up or down relative to a gravity direction) or when the reflective face sheet 310, 410, 510 will be subjected to variable and dynamic loading, orientations, etc. A non-uniform or asymmetric distribution of features defining the non-uniform thickness about the reflective face sheet 310, 410, 510 may be utilized when the reflective face sheet 310, 410, 510 will be primarily oriented facing in a horizontal direction (e.g., perpendicular relative to a gravity direction). In this case, a higher concentration of stiffness enhancing features (e.g., thicker portions) can be located in areas of greatest need, such as at a bottom end of the reflective face sheet 310, 410, 510 when oriented facing a horizontal direction to more effectively counteract the effects of gravity sag. In one aspect, the non-uniform thickness of the reflective face sheet 310, 410, 510 can be defined on the back side 304, 404, 504 to correspond to one or more electromagnets of a deformable mirror. For example, a size, location, etc. of a stiffness enhancing feature (e.g., thicker portions) can be configured to facilitate responsiveness to actuation (e.g., increase actuator stroke). The reflective face sheet 310, 410, 510 (e.g., non-uniform shaping) can be manufactured by any suitable process, such as silicon etching and others.

Figure 8B:
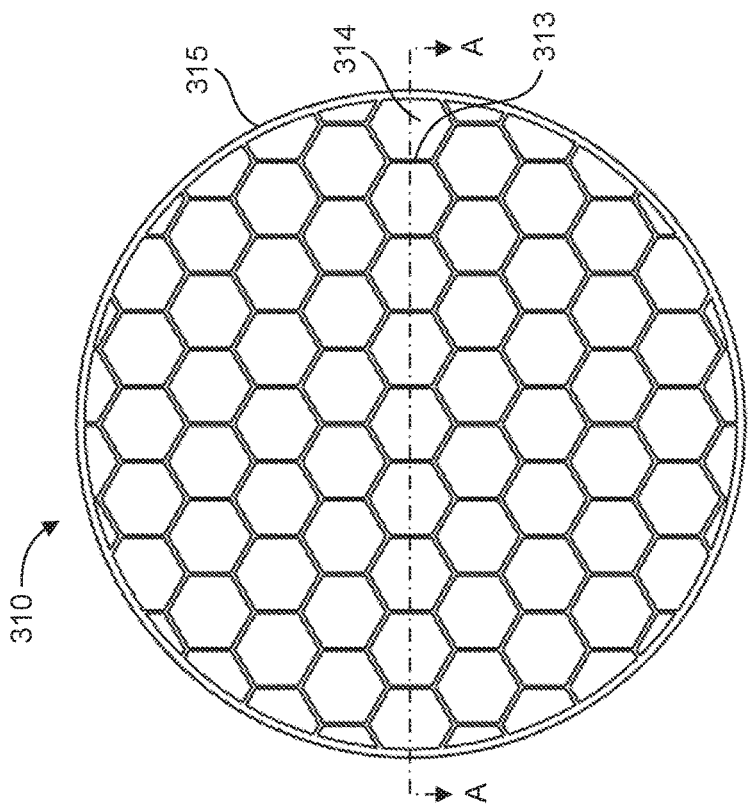
FIGS. 8A-8D illustrate a non-uniform thickness reflective face sheet for a deformable mirror in accordance with an example of the present disclosure.
Figure 8A:
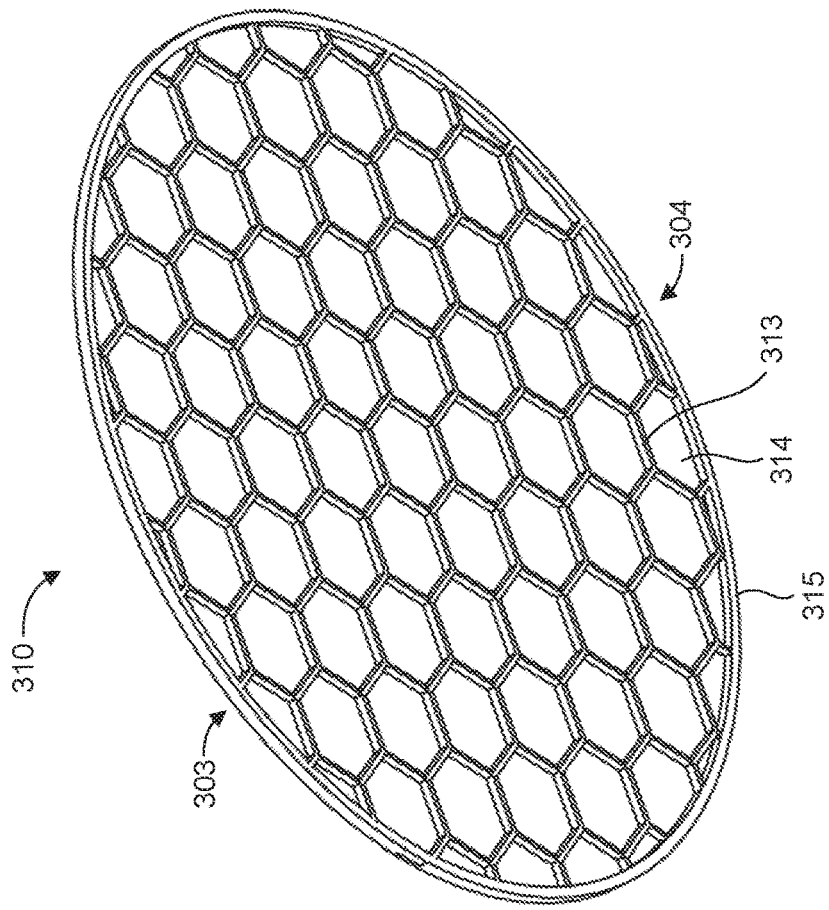
Figure 8C:
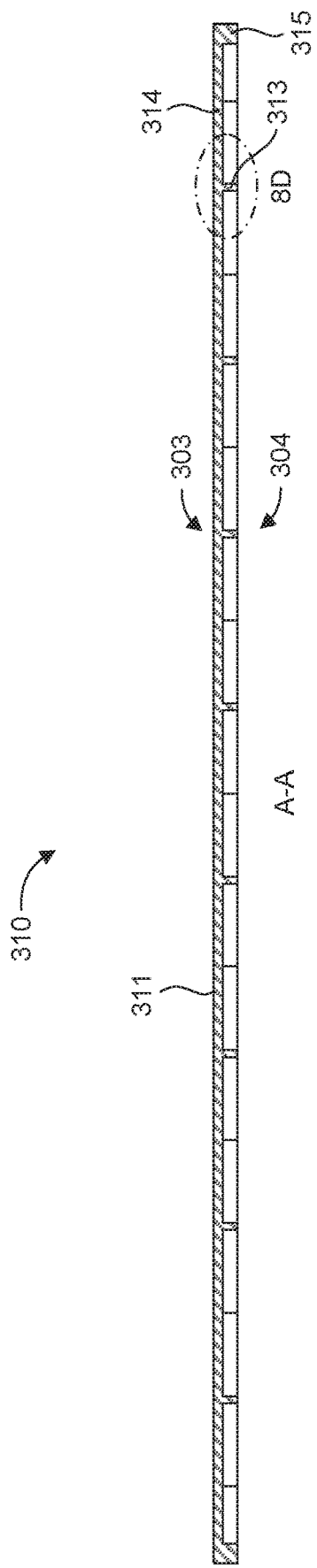
Figure 8D:
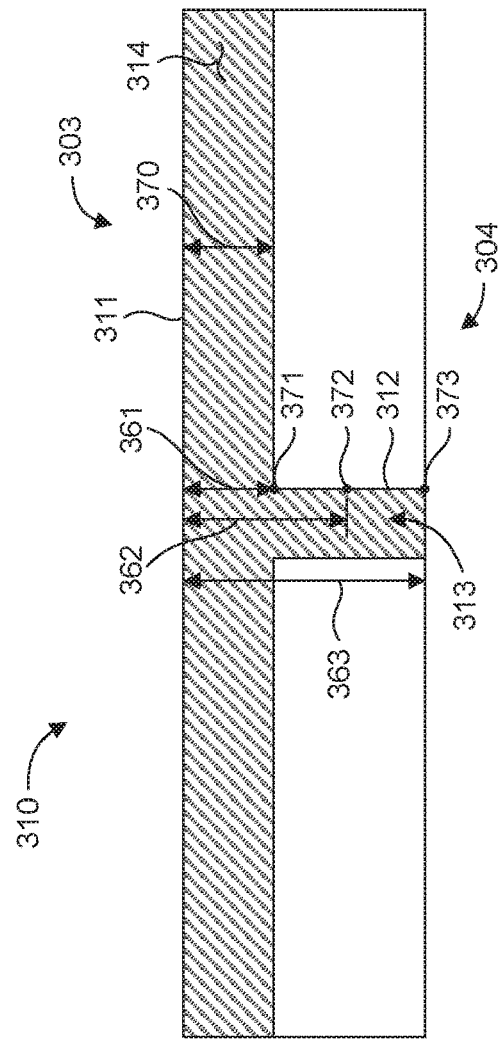
Figure 9B:
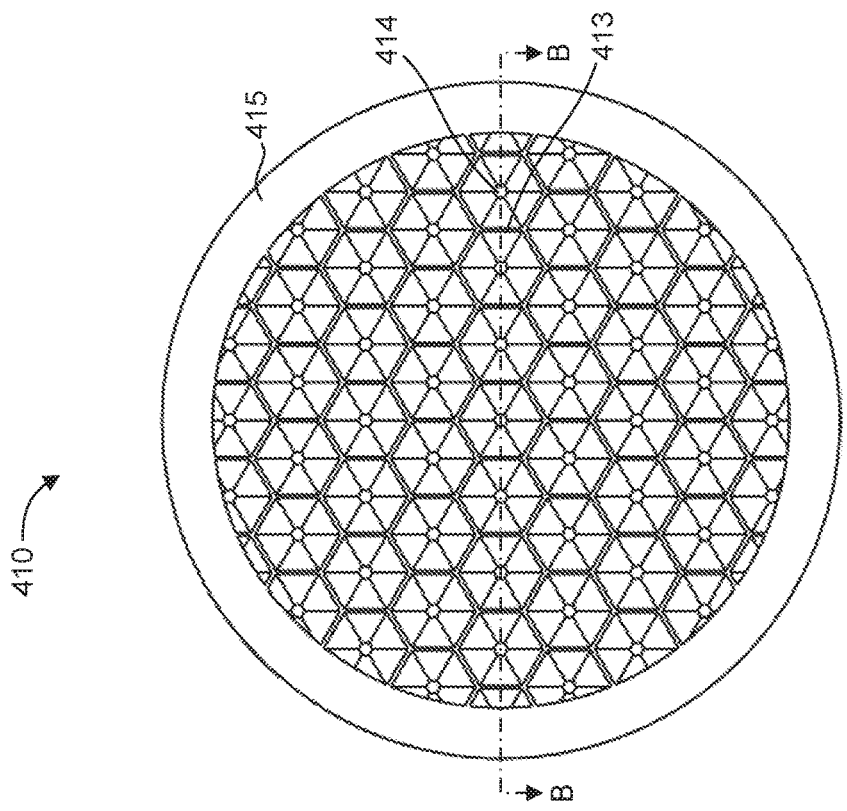
FIGS. 9A-9D illustrate a non-uniform thickness reflective face sheet for a deformable mirror in accordance with another example of the present disclosure.
Figure 9A:
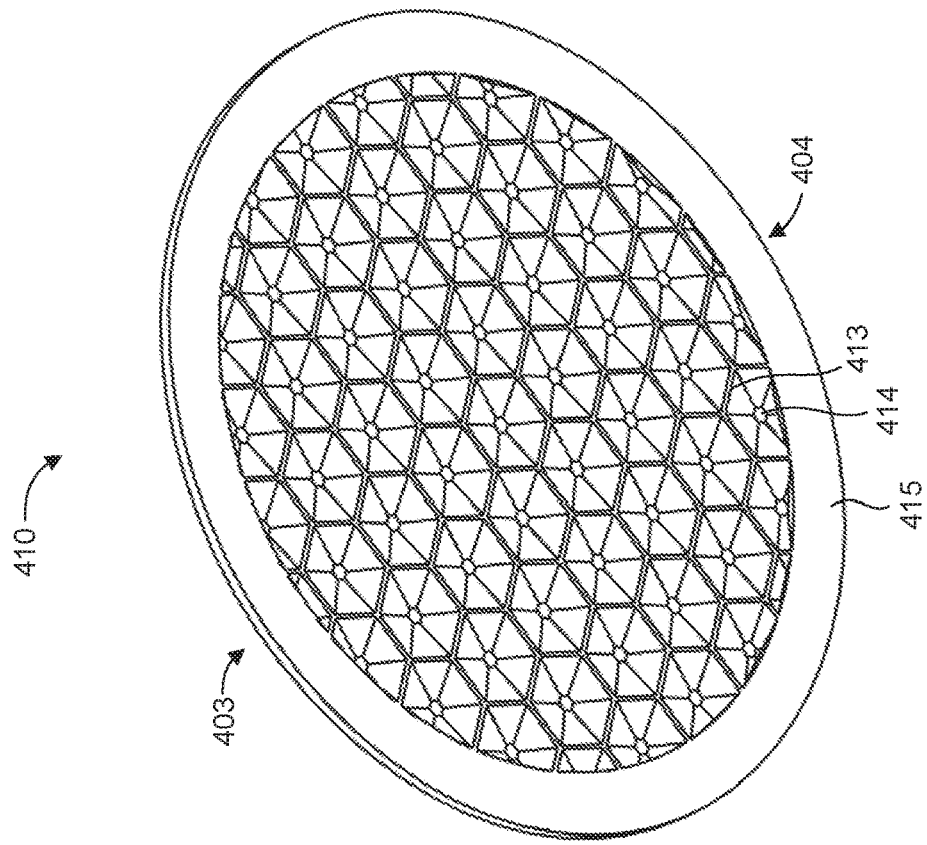
Figure 9C:
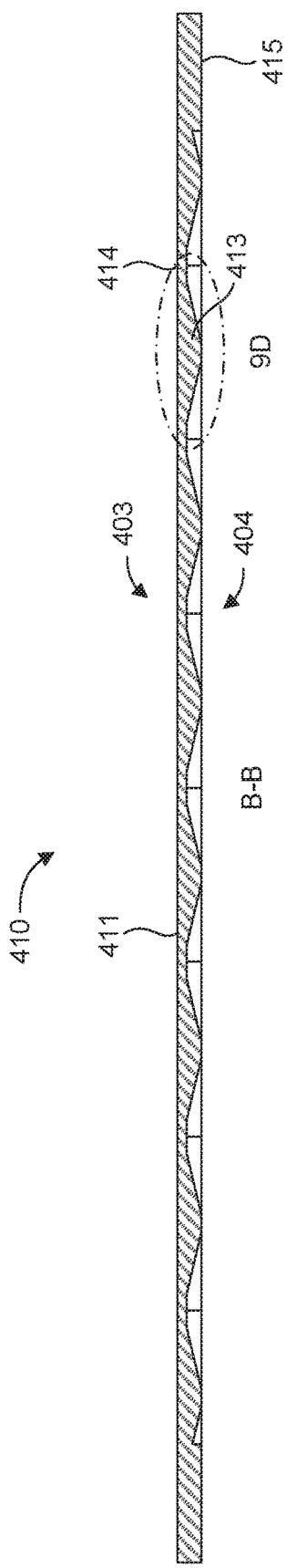
Figure 9D:
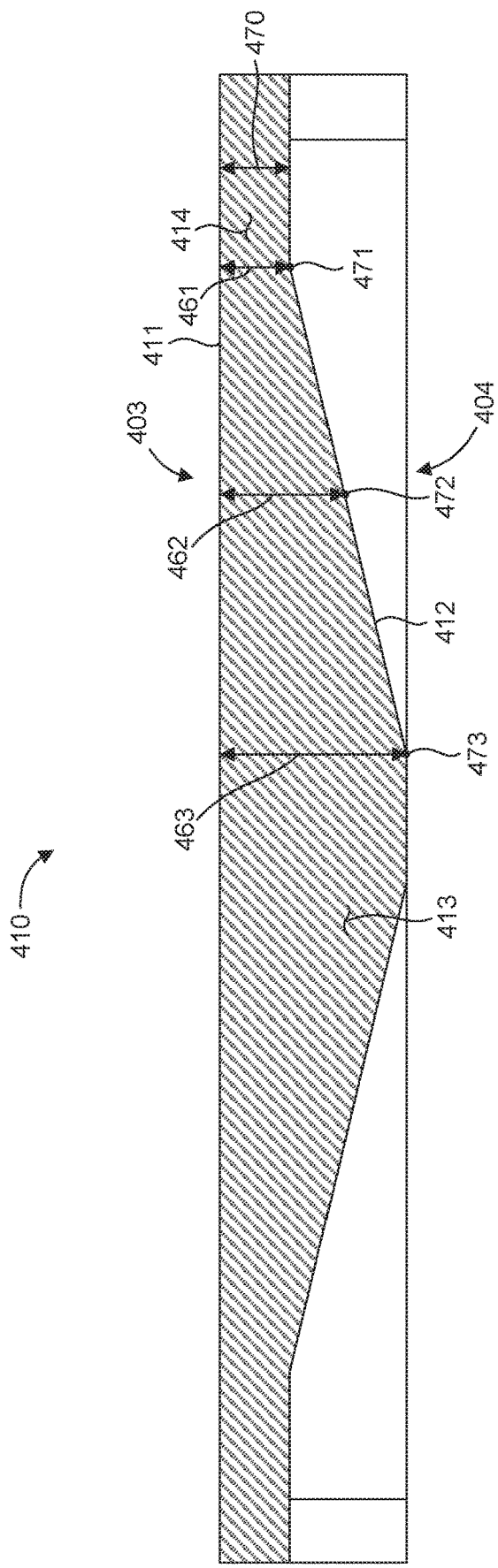

The thickness of the reflective face sheets 310, 410, 510 can vary in any suitable manner, such as an abrupt or step change in thickness, a gradual transition in thickness, or a combination of these. In the example illustrated in FIGS. 8A-8D, the non-uniform thickness is defined by an abrupt step change in thickness. In this case, as shown in FIG. 8D, the reflective face sheet 310 has a first thickness 361 at a first location 371, a second thickness 362 at a second location 372, and a third thickness 363 at a third location 373. The first, second, and third thicknesses 361-363 are different from one another. The first, second, and third locations 371-373 lie on a planar surface portion 312 on the back side 304 of the reflective face sheet 310 substantially perpendicular to the reflective surface 311 on the front side 303. The planar surface portion 312 can at least partially define a rib 313 or protrusion having a rectangular cross-section. In one aspect, the reflective face sheet 310 can have base portion 314 or layer having a baseline thickness 370, and the rib 313 can extend beyond the base portion 314 and the baseline thickness 370. The rib 313 can be integrally formed with the material or structure of the base portion 314 as a single component or the rib 313 can be a separate component, which may or may not be coupled or affixed to the base portion 314. In one aspect, a similar type of rib or other protrusion can form a relatively thick rim 315 as a stiffener about a periphery or edge of the reflective face sheet 310 to maintain flexibility of the reflective face sheet 310 while preventing unwanted distortion, such as due to an interface with an adhesive, sealant, O-ring, etc. coupling the reflective face sheet 310 to a reservoir body. Thus, non-uniform thickness features can also reduce or minimize the sensitivity of the reflective face sheet 310 to the attachment interface (e.g., adhesive or sealant bond, O-ring, etc.) to a reservoir body.

In the examples illustrated in FIGS. 9A-10D, the non-uniform thickness is defined by a gradual change in thickness or a gradual transition of thickness between two points. With regard to the example illustrated in FIGS. 9A-9D, as particularly shown in FIG. 9D, the gradual change in thickness is defined by a planar surface. For example, the reflective face sheet 410 has a first thickness 461 at a first location 471, a second thickness 462 at a second location 472, and a third thickness 463 at a third location 473. The first, second, and third thicknesses 461-463 are different from one another. The first, second, and third locations 471-473 lie on a planar surface portion 412 on the back side 404 of the reflective face sheet 410 non-perpendicular to the reflective surface 411 on the front side 403. The planar surface portion 412 can at least partially define a rib 413 or protrusion having a trapezoidal cross-section. In one aspect, the reflective face sheet 410 can have base portion 414 or layer having a baseline thickness 470, and the rib 413 can extend beyond the base portion 414 and the baseline thickness 470. The rib 413 can be integrally formed with the material or structure of the base portion 414 as a single component or the rib 413 can be a separate component, which may or may not be coupled or affixed to the base portion 414. In one aspect, a similar type of rib or other protrusion can form a relatively thick rim 415 as a stiffener about a periphery or edge of the reflective face sheet 410 to maintain flexibility of the reflective face sheet 410 while preventing unwanted distortion, such as due to an interface with an adhesive, sealant, O-ring, etc. coupling the reflective face sheet 410 to a reservoir body. Thus, non-uniform thickness features can also reduce or minimize the sensitivity of the reflective face sheet 410 to the attachment interface (e.g., adhesive or sealant bond, O-ring, etc.) to a reservoir body.

Figure 10B:
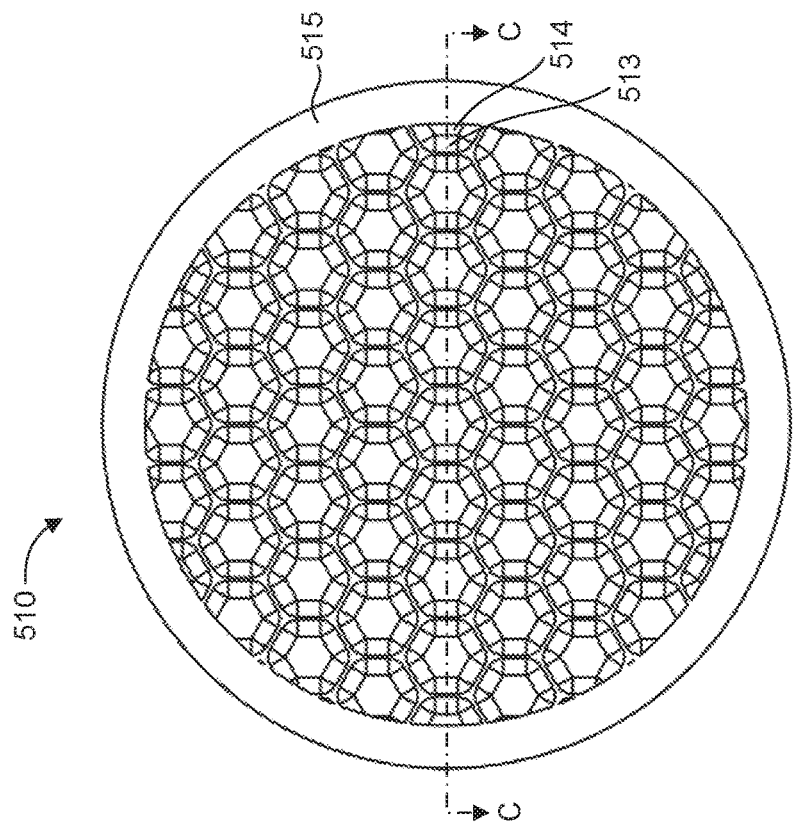
FIGS. 10A-10D illustrate a non-uniform thickness reflective face sheet for a deformable mirror in accordance with yet another example of the present disclosure.
Figure 10A:
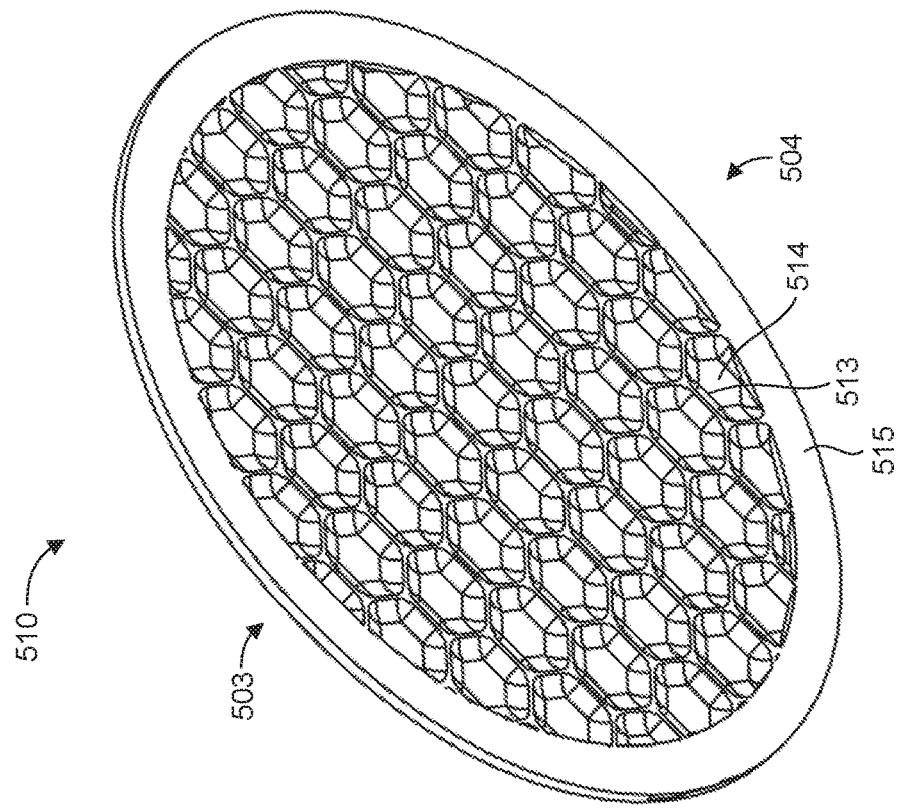
Figure 10C:
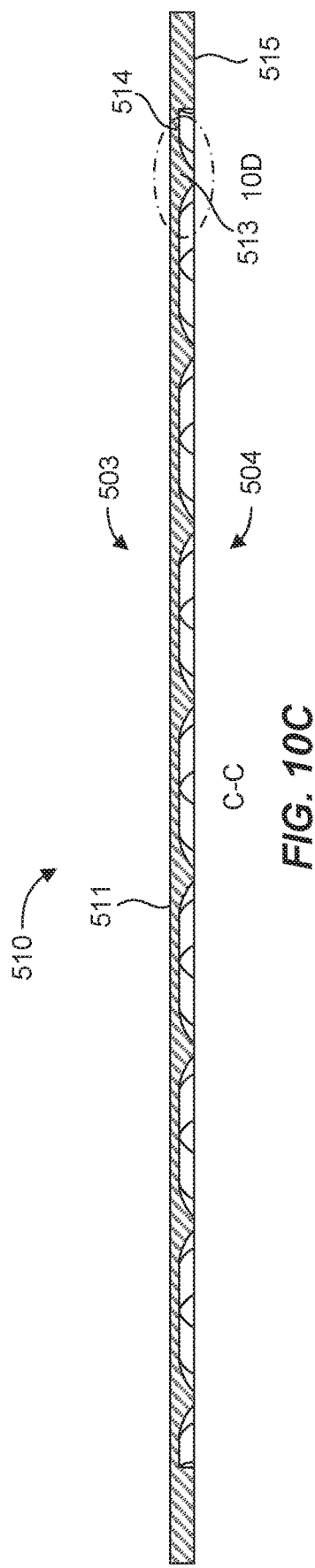
Figure 10D:
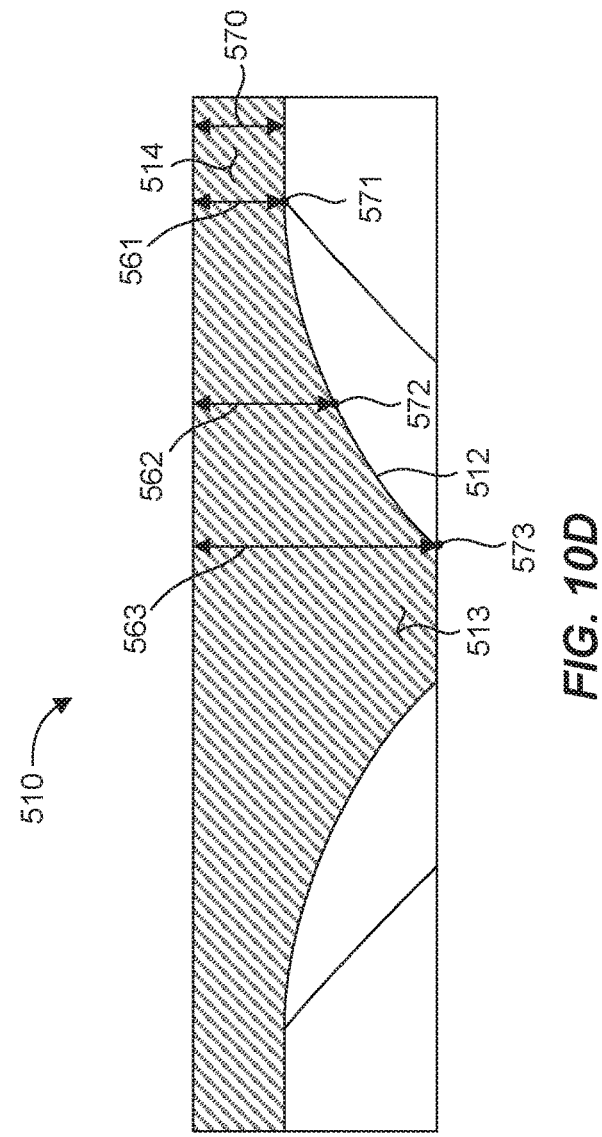

With regard to the example illustrated in FIGS. 10A-10D, as particularly shown in FIG. 10D, the gradual change in thickness is defined by a curved surface. For example, the reflective face sheet 510 has a first thickness 561 at a first location 571, a second thickness 562 at a second location 572, and a third thickness 563 at a third location 573. The first, second, and third thicknesses 561-563 are different from one another. The first, second, and third locations 571-573 lie on a curved surface portion 512 on the back side 504 of the reflective face sheet 510. The curved surface portion 512 can at least partially define a rib 513 or protrusion. In one aspect, the reflective face sheet 510 can have base portion 514 or layer having a baseline thickness 570, and the rib 513 can extend beyond the base portion 514 and the baseline thickness 570. The rib 513 can be integrally formed with the material or structure of the base portion 514 as a single component or the rib 513 can be a separate component, which may or may not be coupled or affixed to the base portion 514. In one aspect, a similar type of rib or other protrusion can form a relatively thick rim 515 as a stiffener about a periphery or edge of the reflective face sheet 510 to maintain flexibility of the reflective face sheet 510 while preventing unwanted distortion, such as due to an interface with an adhesive, sealant, O-ring, etc. coupling the reflective face sheet 510 to a reservoir body. Thus, non-uniform thickness features can also reduce or minimize the sensitivity of the reflective face sheet 510 to the attachment interface (e.g., adhesive or sealant bond, O-ring, etc.) to a reservoir body.

In accordance with one embodiment of the present invention, a method for facilitating active shape control of a mirror is disclosed. The method can comprise obtaining a reservoir containing a ferrofluid. The method can also comprise obtaining a reflective face sheet having a reflective surface on a front side of the reflective face sheet opposite a back side of the reflective face sheet, wherein the reflective face sheet has a non-uniform thickness between the front and back sides of the reflective face sheet to provide stiffness for the reflective face sheet. The method can further comprise covering a front side of the reservoir with the reflective face sheet such that the back side of the reflective face sheet is exposed to the ferrofluid. Additionally, the method can comprise disposing one or more electromagnets about the reservoir operable to generate a magnetic field that acts on the ferrofluid to deform the reflective face sheet and thereby control a shape of the reflective surface. It is noted that no specific order is required in this method, though generally in one embodiment, these method steps can be carried out sequentially.

In one aspect of the method, the non-uniform thickness can be defined by a pattern. In a specific aspect, the pattern can comprise a polygon shape.

In one aspect, the method can further comprise bonding the reflective face sheet with an adhesive to a reservoir body that defines the reservoir to seal the ferrofluid in the reservoir.

In one aspect of the method, disposing the one or more electromagnets about the reservoir comprises maintaining a gap physically separating a reservoir body that defines the reservoir and the one or more electromagnets.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A deformable mirror, comprising:
a reservoir containing a ferrofluid;
a reflective face sheet covering a front side of the reservoir, the reflective face sheet comprising:
  a base portion defining a front side of the reflective face sheet and having a reflective surface on the front side of the reflective face sheet;
  a back side opposite the front side of the reflective face sheet and exposed to the ferrofluid in the reservoir; and
  a plurality of ribs extending from the base portion and at least partially defining the back side of the reflective face sheet, the plurality of ribs providing the reflective face sheet with a non-uniform thickness between the front and back sides of the reflective face sheet to provide stiffness for the reflective face sheet; and
one or more electromagnets operable to generate a magnetic field that acts on the ferrofluid to deform the reflective face sheet,
wherein, the reflective face sheet, in association with at least one of the plurality of ribs, has a first thickness at a first location, a second thickness at a second location, and a third thickness at a third location, the first, second, and third thicknesses being different from one another.

2. The deformable mirror of claim 1, wherein the non-uniform thickness is defined by a pattern of the plurality of ribs formed on the back side.

3. The deformable mirror of claim 2, wherein the pattern comprises a polygon shape.

4. The deformable mirror of claim 1, wherein the first, second, and third locations lie on a planar surface portion on the back side of the reflective face sheet non-perpendicular to the reflective surface.

5. The deformable mirror of claim 1, wherein the first, second, and third thicknesses being different from one another, the first, second, and third locations lie on a curved surface portion on the back side of the reflective face sheet.

6. The deformable mirror of claim 1, wherein the reflective face sheet is a single component.

7. The deformable mirror of claim 1, wherein the reflective face sheet comprises multiple components.

8. The deformable mirror of claim 1, wherein the reflective face sheet is bonded to a reservoir body that defines the reservoir to seal the ferrofluid in the reservoir.

9. The deformable mirror of claim 8, wherein the reflective face sheet is bonded to the reservoir body at a back surface on the back side of the reflective face sheet.

10. The deformable mirror of claim 8, wherein the reflective face sheet is bonded with an adhesive comprising at least one of a Versachem gasket sealant, a hydrocarbon resistant sealant, or an auto engine sealant.

11. The deformable mirror of claim 1, wherein a reservoir body that defines the reservoir and the one or more electromagnets are physically separated from one another by a gap.

12. The deformable mirror of claim 1, further comprising a base in support of the reservoir and the one or more electromagnets.

13. The deformable mirror of claim 12, wherein the base comprises mounting features for mounting the one or more electromagnets to the base.

14. The deformable mirror of claim 13, wherein a number of the mounting features exceeds a number of the one or more electromagnets to provide alternate mounting arrangements for the one or more electromagnets.

15. The deformable mirror of claim 12, further comprising one or more stand-off supports coupling the reservoir to the base.

16. The deformable mirror of claim 1, wherein the one or more electromagnets are positioned relative to a back side of the reservoir.

17. The deformable mirror of claim 1, wherein the one or more electromagnets comprises a plurality of electromagnets.

18. The deformable mirror of claim 1, wherein a reservoir body that defines the reservoir comprises a reservoir fill hole to facilitate filling the reservoir with the ferrofluid.

19. The deformable mirror of claim 1, further comprising a heat transfer device thermally coupled to the one or more electromagnets to facilitate cooling the one or more electromagnets.

20. A deformable mirror system, comprising:
   a deformable mirror including
      a reservoir containing a ferrofluid,
      a reflective face sheet covering a front side of the reservoir, the reflective face sheet comprising:
         a base portion defining a front side of the reflective face sheet and having a reflective surface on the front side of the reflective face sheet;
         a back side opposite the front side of the reflective face sheet and exposed to the ferrofluid in the reservoir; and
         a plurality of ribs extending from the base portion and at least partially defining the back side of the reflective face sheet, the plurality of ribs providing the reflective face sheet with a non-uniform thickness between the front and back sides of the reflective face sheet to provide stiffness for the reflective face sheet, and
      one or more electromagnets operable to generate a magnetic field that acts on the ferrofluid to deform the reflective face sheet; and
   a control system operably coupled to the one or more electromagnets to control the magnetic field and thereby a deformation of the reflective face sheet,
   wherein, the reflective face sheet, in association with at least one of the plurality of ribs, has a first thickness at a first location, a second thickness at a second location, and a third thickness at a third location, the first, second, and third thicknesses being different from one another.

21. The system of claim 20, wherein the one or more electromagnets comprises a plurality of electromagnets.

22. The system of claim 21, wherein the control system is operable to independently control each of the plurality of electromagnets.

23. The system of claim 20, wherein the control system is operable to reverse polarity of the one or more electromagnets.

24. A method for facilitating active shape control of a mirror, comprising:
   obtaining a reservoir containing a ferrofluid;
   obtaining a reflective face sheet comprising:
      a base portion defining a front side of the reflective face sheet and having a reflective surface on the front side of the reflective face sheet;
      a back side opposite the front side of the reflective face sheet and exposed to the ferrofluid in the reservoir; and
      a plurality of ribs extending from the base portion and at least partially defining the back side of the reflective face sheet, the plurality of ribs providing the reflective face sheet with a non-uniform thickness between the front and back sides of the reflective face sheet to provide stiffness for the reflective face sheet;
   covering a front side of the reservoir with the reflective face sheet such that the back side of the reflective face sheet is exposed to the ferrofluid; and
   disposing one or more electromagnets about the reservoir operable to generate a magnetic field that acts on the ferrofluid to deform the reflective face sheet and thereby control a shape of the reflective surface,
   wherein, the reflective face sheet, in association with at least one of the plurality of ribs, has a first thickness at a first location, a second thickness at a second location, and a third thickness at a third location, the first, second, and third thicknesses being different from one another.

25. The method of claim 24, wherein the non-uniform thickness is defined by a pattern of the plurality of ribs.

26. The method of claim 25, wherein the pattern comprises a polygon shape.

27. The method of claim 24, further comprising bonding the reflective face sheet with an adhesive to a reservoir body that defines the reservoir to seal the ferrofluid in the reservoir.

28. The method of claim 24, wherein disposing the one or more electromagnets about the reservoir comprises maintaining a gap physically separating a reservoir body that defines the reservoir and the one or more electromagnets.

* * * * *